US012802211B2

(12) United States Patent
Kim

(10) Patent No.: US 12,802,211 B2
(45) Date of Patent: Nov. 17, 2026

(54) LUMINANCE INSPECTION SYSTEM AND METHOD OF CONTROLLING SAME

(71) Applicant: LG Display Co., Ltd., Seoul (KR)

(72) Inventor: Seong Hyeon Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/019,932

(22) Filed: Jan. 14, 2025

(65) Prior Publication Data

US 2025/0272827 A1 Aug. 28, 2025

(30) Foreign Application Priority Data

Feb. 26, 2024 (KR) ........................ 10-2024-0027328

(51) Int. Cl.
*G06T 7/00* (2017.01)
*G06T 7/11* (2017.01)
*G06T 7/73* (2017.01)
*G06V 10/764* (2022.01)

(52) U.S. Cl.
CPC ................ *G06T 7/001* (2013.01); *G06T 7/11* (2017.01); *G06T 7/73* (2017.01); *G06T 2207/20021* (2013.01); *G06T 2207/20132* (2013.01); *G06T 2207/30108* (2013.01); *G06V 10/764* (2022.01)

(58) Field of Classification Search
CPC ... G06T 7/001; G06T 7/11; G06T 7/73; G06T 2207/20021; G06T 2207/20132; G06T 2207/30108; G06V 10/764
See application file for complete search history.

(56) References Cited

U.S. PATENT DOCUMENTS

2021/0049945 A1* 2/2021 Bae .......................... G09G 3/20
2022/0189422 A1* 6/2022 Wang .................. G09G 3/3406

FOREIGN PATENT DOCUMENTS

KR 10-2020-0000433 A 1/2020
KR 10-2023-0021442 A 2/2023
KR 10-2023-0026872 A 2/2023

* cited by examiner

*Primary Examiner* — Michael E Teitelbaum
(74) *Attorney, Agent, or Firm* — Birch, Stewart, Kolasch & Birch, LLP

(57) ABSTRACT

A luminance inspection system includes a camera configured to capture an image displayed on a display panel having a plurality of pixels to generate a captured image, and an image processor configured to obtain location information of pixels in the captured image. The image processor can divide the captured image into a plurality of pixel regions according to a preset pixel map, and calculate luminance data according to a kernel size set for each pixel region to generate a luminance image of the display panel.

10 Claims, 11 Drawing Sheets

| Pixel | Resolution (%) | LUMINANCE (NIT) |
|---|---|---|
| A1 | 100 | 100 |
| A2 | 50 | 200 |

| Pixel | Resolution (%) | LUMINANCE (NIT) |
|---|---|---|
| A1 | 100 | 100 |
| A2 | 50 | 200 |

Panel
LUMINANCE IMAGE

< Sample No1. >

| | MEASURED LUMINANCE (NIT) | | |
|---|---|---|---|
| Under Display Camera AREA | Lumitop | Crop | |
| | | Kernel 1x1 | Kernel 3x3 |
| TOP | 176.3 | 165.5 | 168.9 |
| CENTER | 179.7 | 172.3 | 171.9 |
| BOTTOM | 180.2 | 174.8 | 173.2 |
| Under Display Camera AREA | LUMINANCE Ratio (%) | | |
| TOP/BOTTOM | **97.8%** | **94.6%** | **97.5%** |

< Sample No2. >

| | MEASURED LUMINANCE (NIT) | | |
|---|---|---|---|
| Under Display Camera AREA | Lumitop | Crop | |
| | | Kernel 1x1 | Kernel 3x3 |
| TOP | 210.7 | 199.7 | 202.1 |
| CENTER | 214.3 | 207.5 | 205.7 |
| BOTTOM | 215.4 | 209.2 | 206.3 |
| Under Display Camera AREA | LUMINANCE Ratio (%) | | |
| TOP/BOTTOM | **97.8%** | **95.4%** | **97.9%** |

LUMINANCE INSPECTION SYSTEM AND METHOD OF CONTROLLING SAME

CROSS-REFERENCE TO RELATED APPLICATIONS

This application claims priority to Korean Patent Application No. 10-2024-0027328, filed in the Republic of Korea on Feb. 26, 2024, the entire contents of which is hereby expressly incorporated by reference into the present application.

BACKGROUND OF THE INVENTION

Field of the Invention

The present disclosure relates to a luminance inspection system and a method of controlling the same.

Discussion of the Related Art

As the information society develops, the demand for displays is increasing in various forms. In response to this demand, various flat panel display devices with characteristics such as compactness, light weight, and low power consumption, are being studied. Examples of the flat panel display devices can be a liquid crystal display, a plasma display panel, and an organic light emitting diode display.

Display device manufacturing processes include a process of manufacturing a display panel, a test process for the completed display panel, etc. During the test process, by detecting and analyzing defects in the completed display panel, the defects can be repaired or reworked to improve the overall yield.

Therefore, a method of accurately detecting the performance of a display panel to be tested is needed.

SUMMARY OF THE INVENTION

Accordingly, the present disclosure is directed to a luminance inspection system and a method of controlling the same that substantially obviate one or more problems due to limitations and disadvantages of the related art.

Aspects of the present disclosure are intended to solve the above-mentioned problems.

An object of the aspects of the present disclosure is to provide a luminance inspection system and a method of controlling the same to improve the accuracy of luminance measurement data of a display panel.

Additional advantages, objects, and features of the present disclosure will be set forth in part in the description which follows and in part will become apparent to those having ordinary skill in the art upon examination of the following or can be learned from practice of the present disclosure. The objectives and other advantages of the present disclosure can be realized and attained by the structure particularly pointed out in the written description and claims hereof as well as the appended drawings.

To achieve these objects and other advantages and in accordance with the purpose of the present disclosure, as embodied and broadly described herein, a luminance inspection system includes a camera configured to capture an image displayed on a display panel including a plurality of pixels to generate a captured image, and an image processor configured to obtain location information of pixels in the captured image, divide the captured image into a plurality of pixel regions according to a preset pixel map, and calculate luminance data according to a kernel size set for each pixel region to generate a luminance image of the display panel.

According to one or more aspects of the present disclosure, the pixel map can include location information of the plurality of pixel regions divided according to characteristics of the pixels included in the display panel.

According to one or more aspects of the present disclosure, characteristics of pixels included the plurality of pixel regions can be classified based on at least one of luminance, resolution, or Pixels Per Inch (PPI).

According to one or more aspects of the present disclosure, the plurality of pixel regions can include a normal area in which a pixel array is arranged and an optical area (e.g., Under Display Camera Area) including a transmission part for an optical device.

According to one or more aspects of the present disclosure, the image processor can set a kernel size of the optical area to be larger than a kernel size of the normal area and calculate luminance data depending on each kernel size.

According to one or more aspects of the present disclosure, the image processor can generate luminance image data (e.g., cropped image) having a size matching an actual number of pixels of the display panel by calculating luminance data of the captured image included in each kernel.

According to one or more aspects of the present disclosure, the kernel size of the normal area can be set to 1×1, and the kernel size of the optical area can be set to 3×3.

According to one or more aspects of the present disclosure, the image processor can obtain the location information of the pixels on the basis of the captured image and a pre-stored panel shape image.

According to one or more aspects of the present disclosure, the luminance inspection system can further include a memory in which a shape image of the display panel for obtaining location information of the pixels in the captured image, a pixel map including location information of the plurality of pixel regions divided according to characteristics of the pixels included in the display panel, and kernel sizes set for the pixel regions are stored.

In another aspect of the present disclosure, a method of inspecting luminance includes receiving a captured image obtained by capturing an image displayed on a display panel including a plurality of pixels, obtaining location information of pixels in the captured image, dividing the captured image into a plurality of pixel regions according to a preset pixel map, setting kernel sizes according to the pixel regions, calculating luminance data of the captured image included in each set kernel, and generating luminance image data (e.g., cropped image) having a size matching an actual number of pixels of the display panel on the basis of the luminance data.

According to one or more aspects of the present disclosure, the plurality of pixel regions can include a normal area in which a pixel array is arranged and an optical area including a transmission part for an optical device.

According to one or more aspects of the present disclosure, a kernel size of the optical area can be set to be larger than a kernel size of the normal area.

According to one or more aspects of the present disclosure, the obtaining of the location information of the pixels in the captured image can include obtaining the location information of the pixels on the basis of the captured image and a pre-stored panel shape image.

According to one or more aspects of the present disclosure, the method can further include storing a shape image of the display panel for obtaining location information of the pixels in the captured image, a pixel map including location information of the plurality of pixel regions classified according to characteristics of the pixels included in the display panel, and kernel sizes set for the pixel regions.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate aspect(s) of the present disclosure and together with the description serve to explain the principle of the present disclosure. In the drawings.

DETAILED DESCRIPTION OF THE EMBODIMENTS

Figure 1:
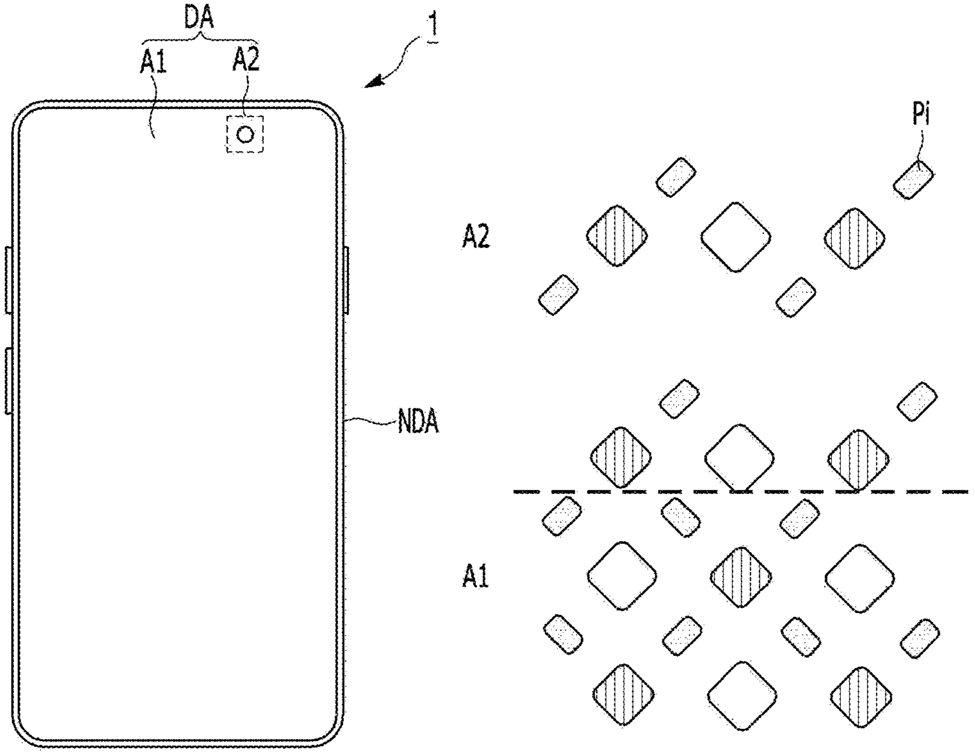
FIG. 1 is a diagram schematically showing a structure of a display panel.

The advantages and features of the present disclosure and the way of attaining the same will become apparent with reference to aspects described below in detail in conjunction with the accompanying drawings. The present disclosure, however, is not limited to the aspects disclosed hereinafter and can be embodied in many different forms. Rather, these exemplary aspects are provided so that this disclosure will be through and complete and will fully convey the scope to those skilled in the art.

The shapes, sizes, ratios, angles, numbers, and the like, which are illustrated in the drawings in order to describe various aspects of the present disclosure, are merely given by way of example, and therefore, the present disclosure is not limited to the illustrations in the drawings.

When an element is “coupled” or “connected” to another element, it should be understood that a third element can be present between the two elements although the element can be directly coupled or connected to the other element. When an element is “directly coupled” or “directly connected” to another element, it should be understood that no element is present between the two elements. Other expressions that describe the relationship between elements, such as “between” and “immediately between” or “adjacent to” and “directly adjacent to” should be interpreted similarly.

When describing positional relationships, for example, when the positional relationship between two parts is described using “on”, “above”, “below”, “beside”, or the like, one or more other parts can be located between the two parts unless the term “directly” or “closely” is used.

In the present disclosure, it will be understood that the terms “comprise” and “include” specify the presence of stated features, integers, steps, operations, elements, components, and/or combinations thereof, but do not preclude the presence or addition of one or more other features, integers, steps, operations, elements, components, and/or combinations.

Further, the term “can” fully encompasses all the meanings and coverages of the term “may.”

Unless otherwise defined, all terms including technical and scientific terms used herein have the same meaning as commonly understood by one of ordinary skill in the art to which example aspects belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Meanwhile, if an aspect can be implemented differently, functions or operations specified within a specific block can occur differently from the order specified in a flowchart. For example, two consecutive blocks can actually be performed substantially simultaneously, or the blocks can be performed in reverse depending on functions or operations involved.

Hereinafter, aspects of the present disclosure will be described in detail with reference to the attached drawings. All the components of each device and system according to all embodiments of the present disclosure are operatively coupled and configured.

In the following description, if a detailed description of known techniques associated with the present disclosure would unnecessarily obscure the gist of the present disclosure, detailed description thereof will be omitted or may be briefly discussed.

Figure 2:
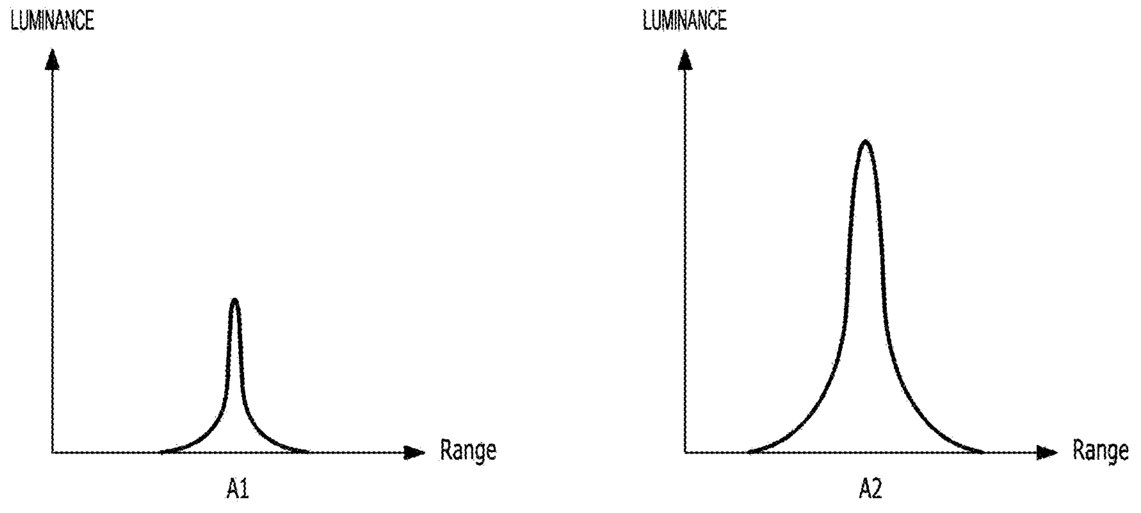
FIG. 2 is a diagram for describing luminance characteristics of each pixel of the display panel of FIG. 1.
Figure 3:
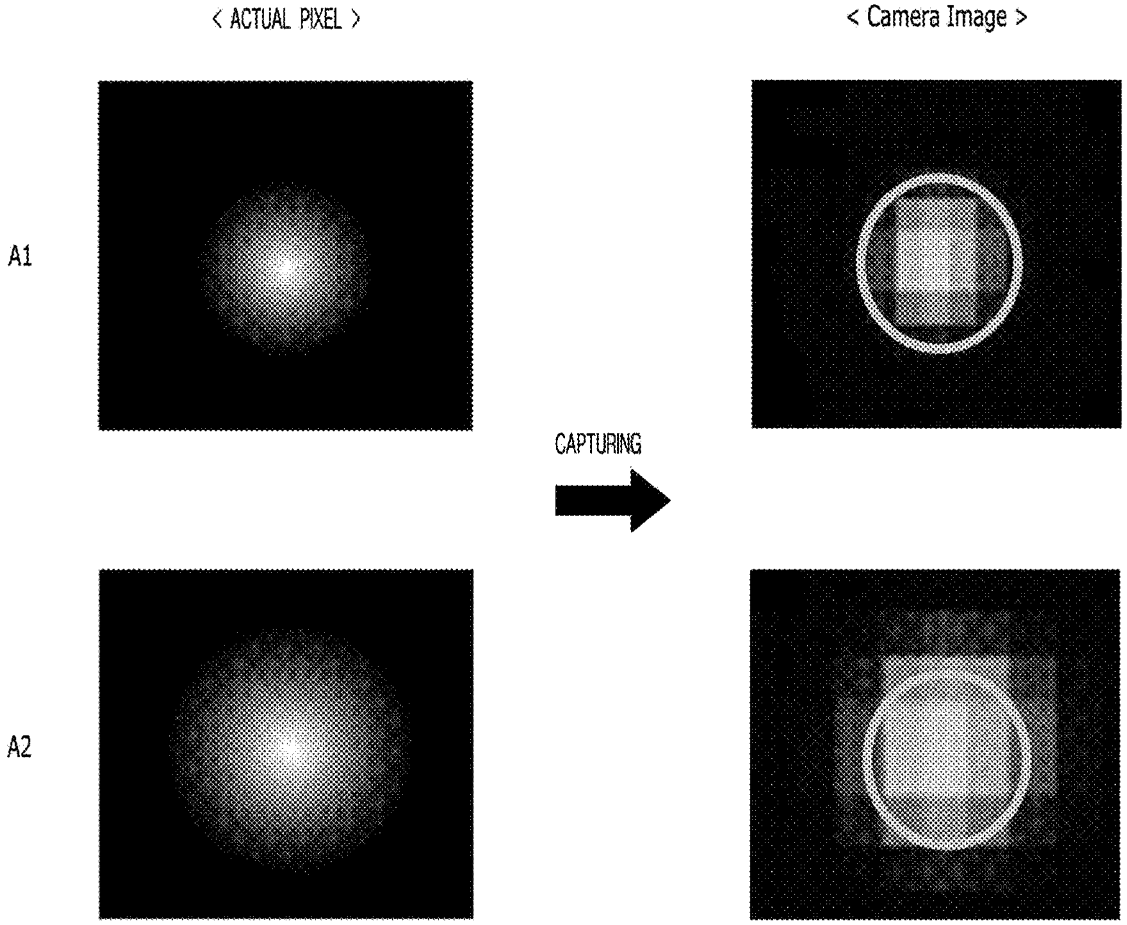
FIG. 3 is a diagram for describing light emission characteristics of each pixel of the display panel of FIG. 1.

FIG. 1 to FIG. 3 are diagrams illustrating a display panel to be inspected. Particularly, FIG. 1 is a diagram schematically showing a structure of the display panel, FIG. 2 is a diagram illustrating luminance characteristics of each pixel of the display panel of FIG. 1, and FIG. 3 is a diagram illustrating light emission characteristics of each pixel of the display panel of FIG. 1.

Here, the display panel can be a liquid crystal display (LCD) panel, an organic light emitting diode panel including organic light emitting diodes (OLEDs), or a micro light emitting diode (μLED) panel.

Referring to FIG. 1 to FIG. 3, a display panel 1 to be inspected can include a display area DA (or active area) in which an image is displayed and a non-display area NDA (or non-active area) in which no image is displayed.

The non-display area NDA can be an area outside the display area DA. The non-display area NDA can surround the display area DA entirely or only in part(s). Various signal lines can be disposed in the non-display area NDA and various driving circuits can be connected thereto. The non-display area NDA is also called a bezel or a bezel area, or can include a bezel area.

A plurality of pixels Pi for displaying an image can be disposed in the display area DA. Here, the display area DA can include a normal area A1 and one or more optical areas A2.

The optical area A2 refers to an area in which an optical device is disposed. The optical device that receives light transmitted through the display panel 1 and performs a predetermined function according to the received light can be disposed under the optical area A2 (on the side opposite to the viewing surface). The optical device can include an imaging device such as a camera, detection sensors such as a proximity sensor and an illuminance sensor, and the like. For example, the optical device can be an infrared sensor but is not limited thereto.

The optical device is a device that needs light reception, and thus is located under the display area DA (opposite the viewing surface) and receives light that has passed through the display panel 1. Therefore, the optical area A2 in which the optical device is disposed needs to have both an image display structure and a light transmission structure. That is, since the optical area A2 is a part of the display area DA, pixels Pi for image display need to be disposed in the optical area A2 and a light transmission structure for transmitting light to the optical device needs to be formed therein.

Accordingly, the normal area A1 and the optical area A2 can have different resolutions, different pixel (Pi) arrangement structures, different numbers of pixels Pi per unit area, etc. For example, the number of pixels per unit area in the optical area A2 can be less than the number of pixels per unit area in the normal area A1. Here, the number of pixels per unit area is a unit for measuring resolution, and can also be referred to as PPI (Pixels Per Inch) which indicates the number of pixels per inch. Since the optical area A2 includes the light transmission structure, the PPI of the optical area A2 can be less than that of the normal area A1. As a result, the optical area A2 has lower resolution and higher luminance (NIT) than the normal area A1. For example, the normal area A1 can have a resolution of 100% and a luminance of 100 nit, while the optical area A2 can have a resolution of 50% and a luminance of 200 nit.

FIG. 2 is a graph comparing luminances of the normal area A1 and the optical area A2.

Referring to FIG. 2, the optical area A2 can emit light with higher luminance than the normal area A1. Accordingly, the optical area A2 is characterized by a wider scattering range than the normal area A1. Due to these differences in luminance and scattering range, there are differences in images captured by a camera between the normal area A1 and the optical area A2.

FIG. 3 is a diagram comparing light emission states of the normal area A1 and the optical area A2 and images captured by a camera.

Referring to FIG. 3, when an actual pixel emits light, the pixel in the optical area A2 has a wider scattering range than the pixel in the normal area A1. Accordingly, in images captured by a camera, the optical area A2 is captured as an image having a wider scattering range than the normal area A1. Therefore, if a kernel size is set on the basis of the scattering range of pixels in the normal area A1, all the luminance of the pixels in the normal area A1 can be reflected, but pixels of the optical area A2 which are not included in the kernel can be omitted from luminance data, which can errors cause in luminance information. Additionally, if the kernel size is increased on the basis of the scattering range of the pixels in the optical area A2, errors can occur in the luminance information of the pixels in the normal area A1 due to interference between adjacent pixels.

As described above, the normal area A1 and the optical area A2 have different PPIs and luminances. The optical area A2 with relatively high luminance has a wider scattering range than the normal area A1 during image capture. Therefore, when a cropped image is generated by applying a kernel size set on the basis of the normal area A1, an error occurs in the cropped image because it does not include all of scattered light.

Accordingly, in a luminance inspection system according to an aspect of the present disclosure, an image processor 200 which generates a cropped image can generate a cropped image by applying different kernel sizes depending on the characteristics of the pixels included in the display panel 1 to improve luminance detection capability.

Figure 4:
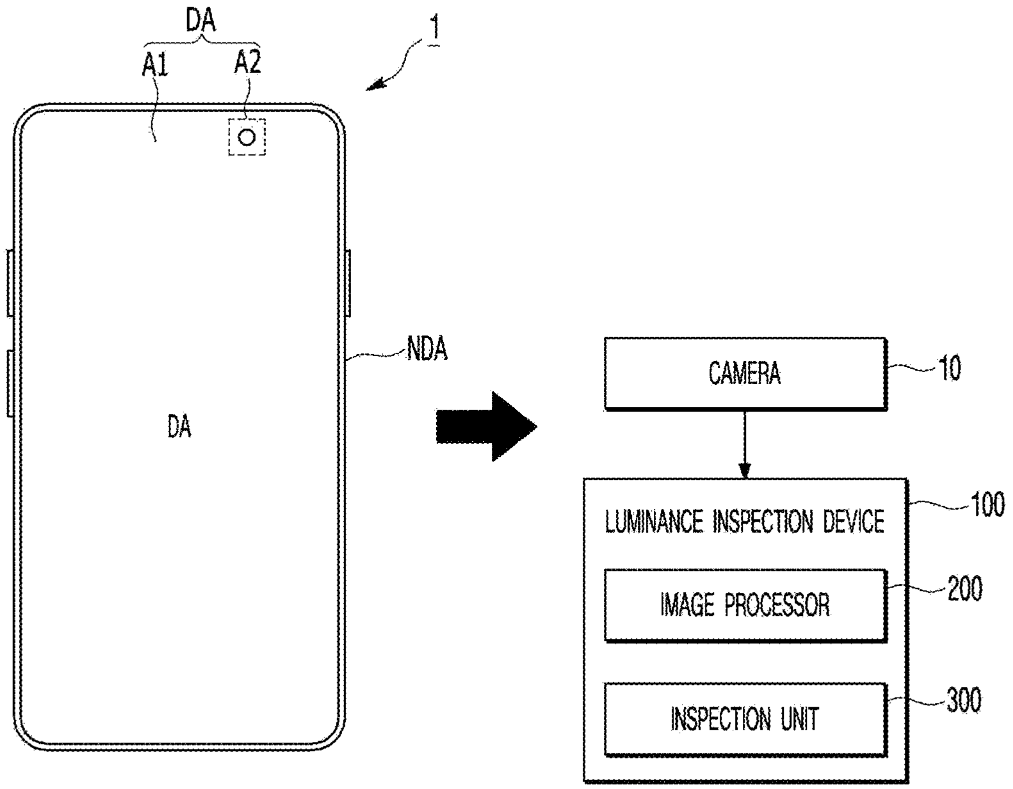
FIG. 4 is a schematic configuration diagram of a luminance inspection system according to an aspect of the present disclosure.

FIG. 4 is a schematic configuration diagram of the luminance inspection system according to an aspect of the present disclosure.

Referring to FIG. 4, the luminance inspection system according to an aspect of the present disclosure includes a camera 10 that captures an image of the display panel 1 and a luminance inspection device 100.

The display panel 1 is a panel of a manufacturing process line and can display a test pattern for luminance detection during inspection. A test pattern for luminance measurement can include a solid pattern. The solid pattern refers to a pattern in a single color.

The camera 10 captures an image of the test pattern displayed on the display panel 1 to be inspected and transmits the captured image to the luminance inspection device 100.

The luminance inspection device 100 can detect the luminance of the display panel 1 by processing the captured image input from the camera 10. The luminance inspection device 100 can detect defects in the display panel 1 or compensate for a deviation of luminance or smear using luminance detection results.

The luminance inspection device 100 can include the image processor 200 and an inspection unit 300.

The image processor 200 can generate luminance image data (hereinafter a cropped image) of a size that matches the actual number of pixels Pi of the display panel 1 on the basis of the captured image. The image processor 200 of the luminance inspection system according to the aspect of the present disclosure generate a cropped image by applying different kernel sizes depending on the characteristics of the pixels Pi included in the display panel 1, thereby improving the luminance detection capability.

The inspection unit 300 can process the cropped image according to a preset algorithm to generate compensation data to compensate for defects such as luminance deviation or smear.

Figure 5:
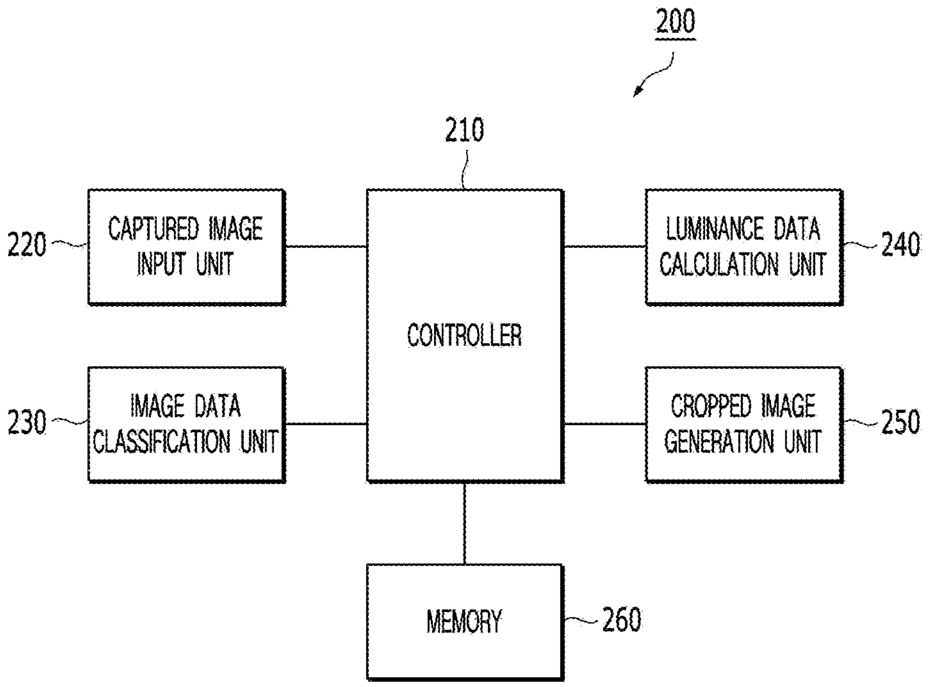
FIG. 5 is a schematic configuration diagram of an image processor of the luminance inspection system according to an aspect of the present disclosure.

FIG. 5 is a schematic configuration diagram of the image processor 200 of the luminance inspection system according to an aspect of the present disclosure.

Referring to FIG. 5, the image processor 200 includes a captured image input unit 220, an image data classification unit 230, a luminance data calculation unit 240, a cropped image generation unit 250, a memory 260, and a controller 210.

The captured image input unit 220 receives an image captured by the camera 10. The image captured by the camera 10 can be an image of a test pattern for luminance measurement displayed on the display panel 1. For example, a captured image of an R/G/B solid pattern displayed by the display panel 1 can be input through the captured image input unit 220.

The image data classification unit 230 obtains pixel location information in the captured image on the basis of a captured image of the display area DA and a previously stored shape image of the actual panel. The image data classification unit 230 compares location information of each pixel with a pre-stored pixel map and classifies the captured image data into a plurality of groups. Here, the pixel map can include location information of the normal area A1 and the optical area A2. Accordingly, the image data classification unit 230 can classify an image of pixels having coordinates corresponding to the normal area A1 and an image of pixels having coordinates corresponding to the optical area A2 in the captured image into different groups.

The luminance data calculation unit 240 calculates luminance data of pixels for each group by applying kernel sizes set according to the classification groups of the captured image data. That is, luminance data can be calculated by applying kernels of different sizes to the pixel image of the normal area A1 and the pixel image of the optical area A2.

The cropped image generation unit 250 generates a cropped image having a size that matches the actual number of pixels of the display panel 1 on the basis of the luminance data calculation result.

The memory 260 can store various types of information for controlling the luminance inspection system. For example, the memory 260 can store panel shape image data for obtaining location information of pixels, a pixel map for classifying image data into a plurality of groups according to the location of a pixel image, a kernel size for each group, etc.

The controller 210 can control each component of the image processor 200 to generate a cropped image from an image captured by the camera 10.

A method of controlling the luminance inspection system according to an aspect of the present disclosure which has the above-described configuration will be described in detail with reference to the flowchart of FIG. 6 and with reference to FIG. 7 to FIG. 10.

Figure 6:
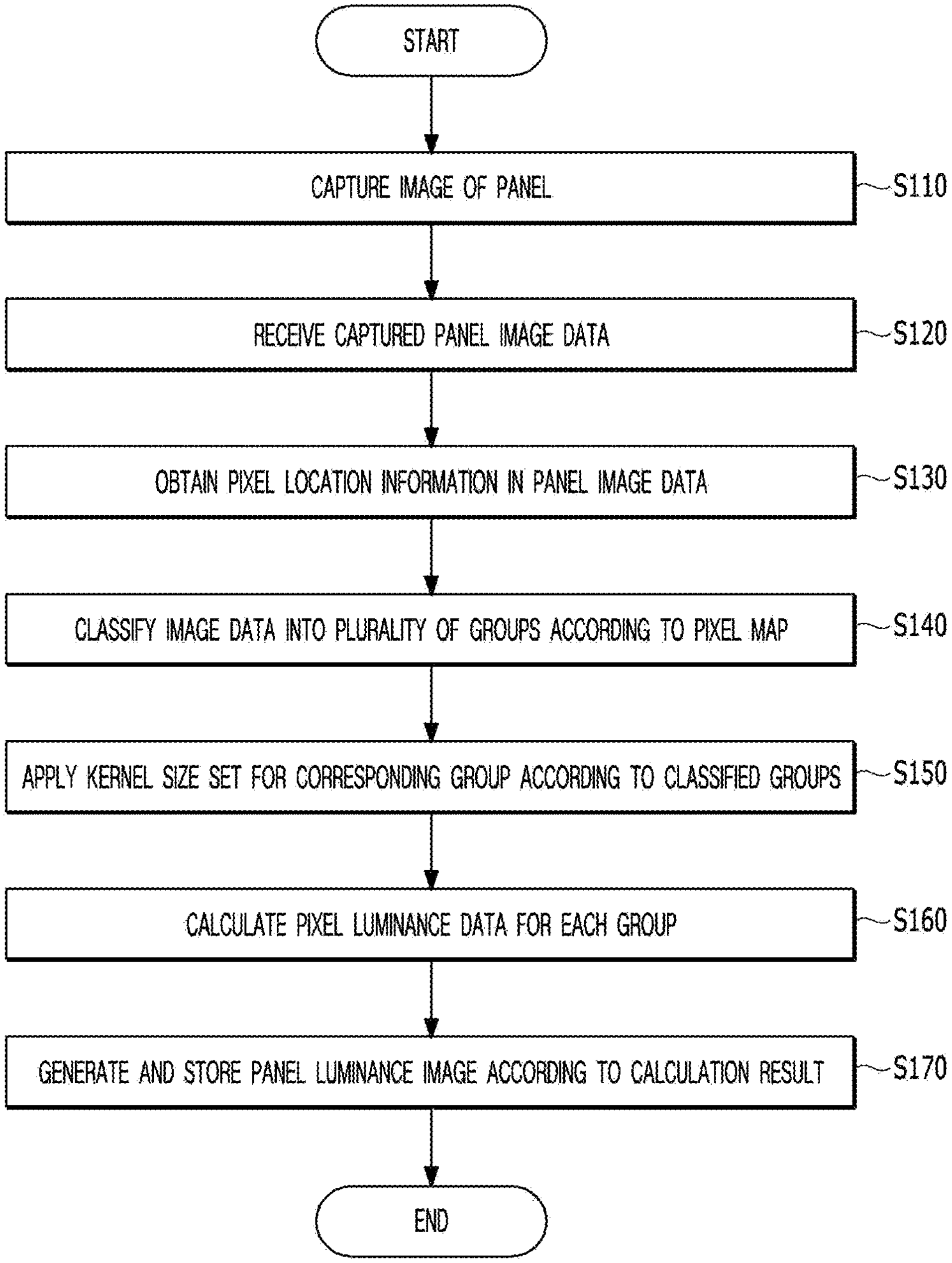
FIG. 6 is a flowchart of a method of controlling the luminance inspection system according to an aspect of the present disclosure.
Figure 7:
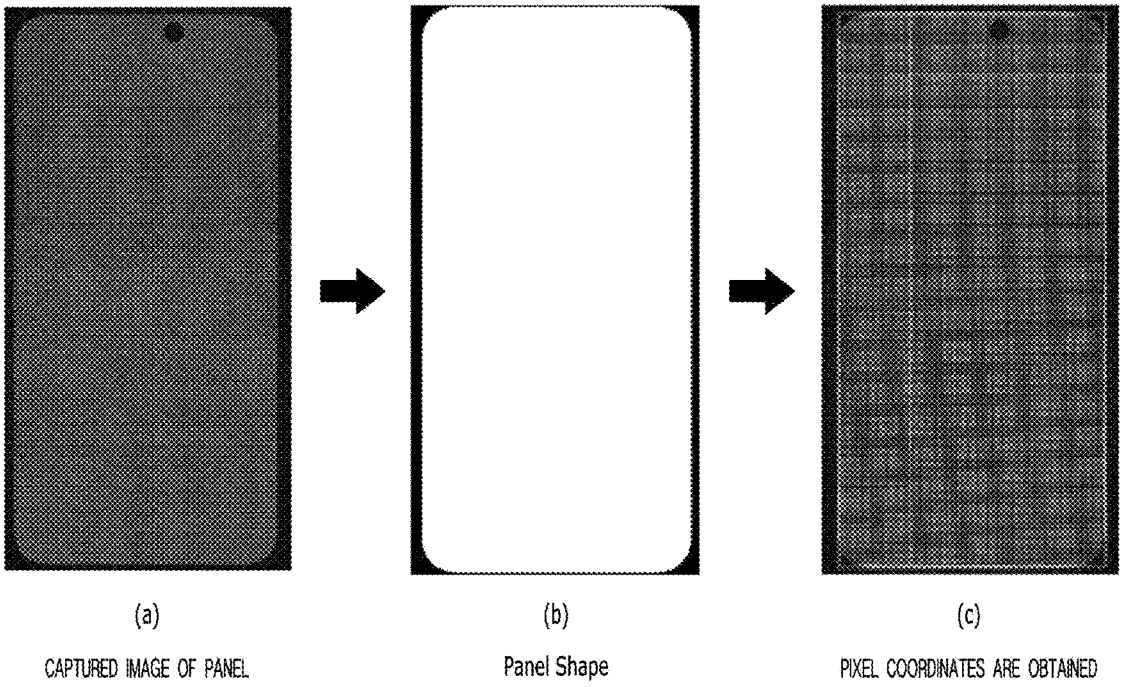
FIG. 7 is a diagram for describing a method of acquiring pixel location information of the luminance inspection system according to an aspect of the present disclosure.
Figure 8:
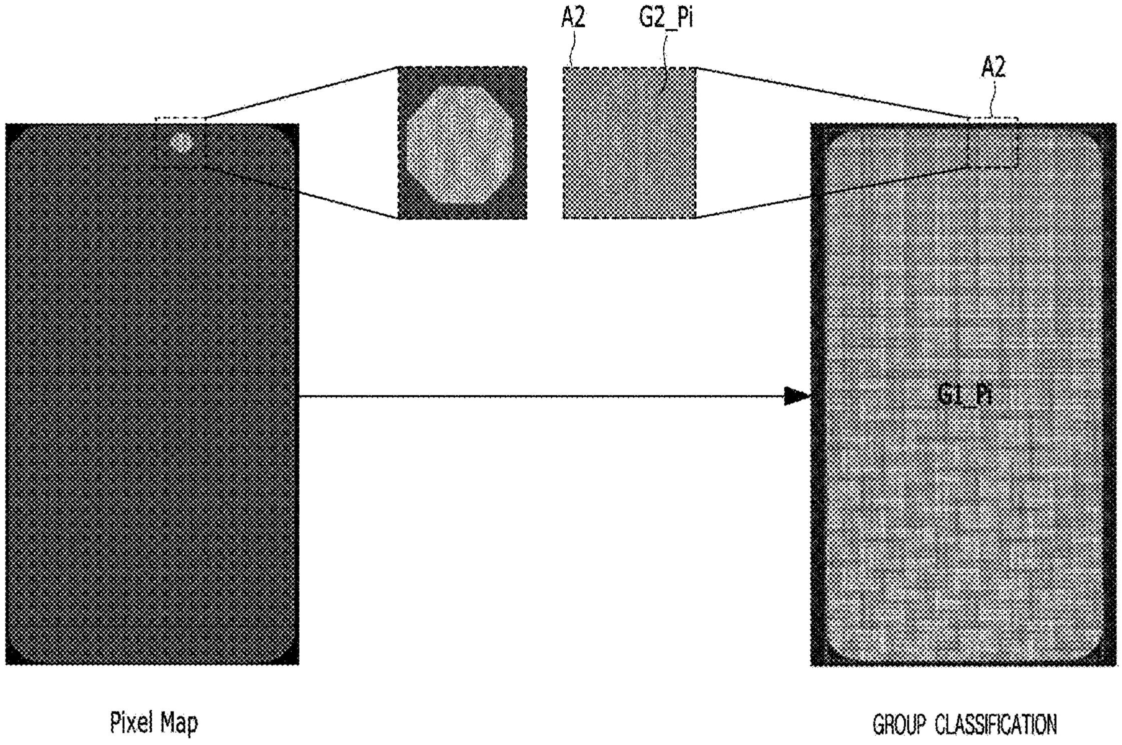
FIG. 8 is a diagram for describing a method of classifying image data of the luminance inspection system according to an aspect of the present disclosure.
Figure 9:
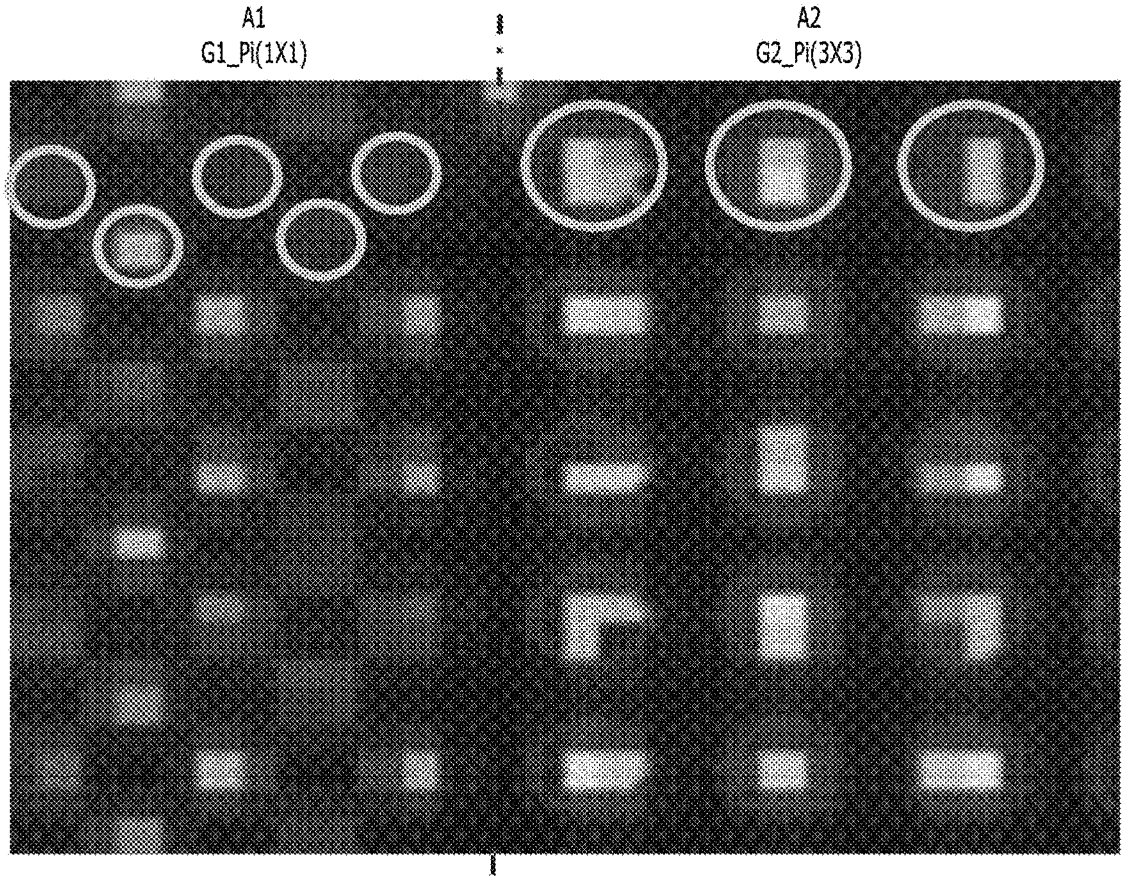
FIG. 9 is a diagram for describing a method of setting a kernel size of the luminance inspection system according to an aspect of the present disclosure.
Figure 10:
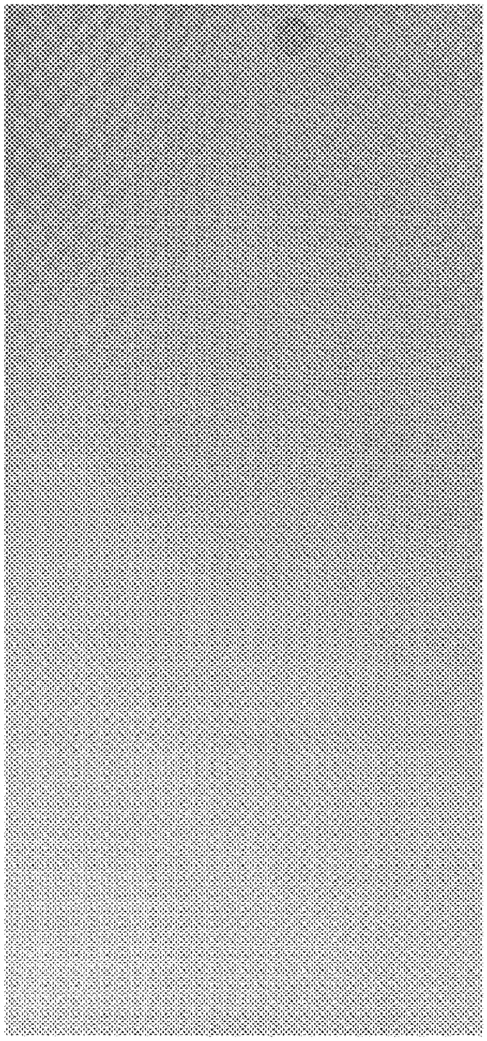
FIG. 10 is a diagram illustrating a cropped image generated in the luminance inspection system according to an aspect of the present disclosure.

FIG. 6 is a flowchart of a method of controlling the luminance inspection system according to an aspect of the present disclosure. FIG. 7 is a diagram for describing a method of acquiring pixel location information of the luminance inspection system according to an aspect of the present disclosure. FIG. 8 is a diagram for describing a method of classifying image data of the luminance inspection system according to an aspect of the present disclosure. FIG. 9 is a diagram for describing a method of setting a kernel size of the luminance inspection system according to an aspect of the present disclosure. FIG. 10 is a diagram illustrating a cropped image generated in the luminance inspection system according to an aspect of the present disclosure. Referring to FIG. 6, for luminance inspection, the display panel 1 is captured using the camera 10 (S110). The display panel 1 can display R, G, and B (red, green, and blue) solid patterns for luminance inspection.

The image processor 200 receives a captured image of the display panel 1 captured by the camera 10 through the captured image input unit 220 (S120).

The image data classification unit 230 acquires location information of pixels in the captured image (S130). Referring to FIG. 7, the image data classification unit 230 can acquire location information of the pixels on the basis of a captured panel image for each color as shown in (a) and a pre-stored panel shape of the display area DA as shown in (b).

The image data classification unit 230 classifies image data into a plurality of groups according to a pre-stored pixel map (S140). Referring to FIG. 8, a pixel map can include location information of the normal area A1 and the optical area A2. The image data classification unit 230 can classify data of the captured image of the normal area A1 and the optical area A2 into two groups G1 and G2 using the location information of the pixels of the captured image and the pixel map. For example, image data of the normal area A1 can be classified as first group pixel image data G1_Pi, and image data of the optical area A2 can be classified as second group pixel image data G2_Pi. Pixel maps having different values can be used for the respective groups. For example, a pixel map with 128 values can be used for the first group of the normal area A1, and a pixel map with 255 values can be used for the second group of the optical area A2. In this manner, image data can be classified into a plurality of groups by applying pixel maps with different values to classify the values for each group in classification of groups.

The luminance data calculation unit 240 sets kernel sizes according to the classified groups of the captured image data (S150). Referring to FIG. 9, a kernel of size of 1×1 can be applied to the first group pixel image data G1_Pi having a 128-value pixel map of the normal area A1. A kernel of size of 3×3 can be applied to the second group pixel image data G2_Pi having a 255-value pixel map of the optical area A2. That is, for the optical area A2 with a wider scattering range, the kernel size can be increased such that the scattering range is included. For example, pixels in the normal area A1 and pixels in the optical area A2 can have different structures. For example, pixels in the normal area A1 can be smaller than pixels in the optical area A2, but the present disclosure is not limited thereto. In the previous step, the luminance data calculation unit 240 calculates luminance data of pixels for the respective groups by applying the kernel sizes set according to classified groups (S160). That is, luminance data can be calculated by applying kernels of different sizes to the pixel image of the normal area A1 and the pixel image of the optical area A2. Since the luminance data is calculated by applying a kernel of an appropriate size depending on the scattering range of each pixel in this manner, the accuracy of luminance data can be improved by removing luminance data that interferes with each other or missing luminance data due to the kernel size.

The cropped image generation unit 250 can generate a cropped image having a size that matches the actual number of pixels of the display panel 1 on the basis of the luminance data calculation result (S170). FIG. 10 is a diagram illustrating a cropped image generated by the cropped image generation unit 250.

As described above, when pixels having different characteristics within a single display panel are captured, the accuracy of luminance image data can be improved by applying a variable kernel size using a pixel map having the same structure as the actual panel structure in group classification.

Figures 11, 12:
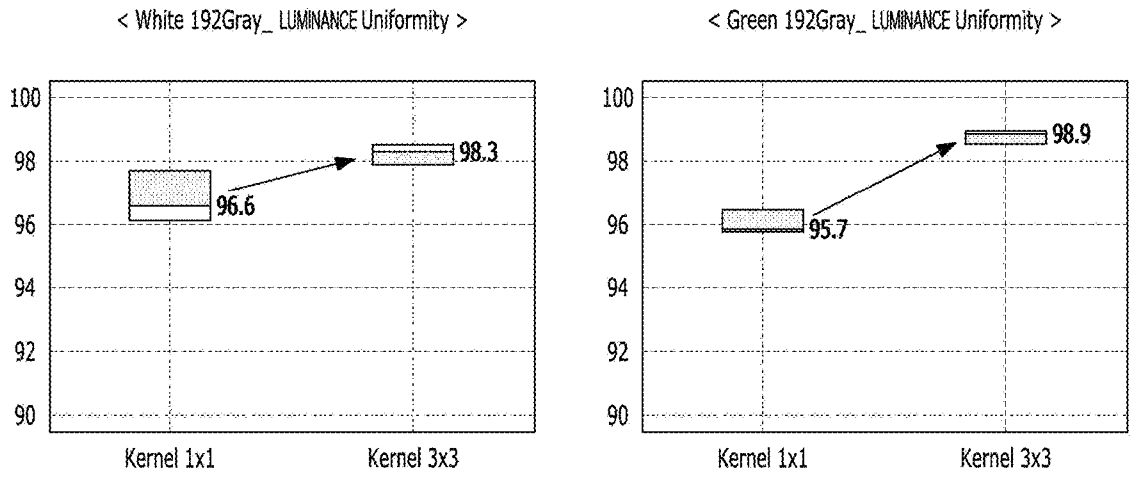
FIG. 11 and FIG. 12 show results of simulation of luminance measurement results of a comparative example and an aspect of the present disclosure.

FIG. 11 and FIG. 12 show results of simulation of luminance measurement results of a comparative example and an aspect of the present disclosure.

Particularly, FIG. 11 is a table showing comparison between results of measuring the actual luminance of an optical area using Lumitop, which is surface luminance measurement equipment, and luminance data measured by generating a cropped image.

Referring to FIG. 11, based on the values measured with Lumitop, the top/bottom luminance ratio is measured as 97.8% which is a satisfactory value.

According to the comparative example, the top/bottom luminance ratio of the cropped image generated with a kernel size of 1×1 is 94.6%, which is different from the actual measured value.

According to the aspect of the present disclosure, when the kernel size of the normal area A1 is set to 1×1 and the kernel size of the optical area A2 is set to 3×3, the top/bottom luminance ratio is measured as 97.5%, which is similar to the actual measurement value, and thus it can be ascertained that the luminance detection capability using a camera has been improved.

FIG. 12 shows graphs of luminance uniformity measured in a case of compensation based on a cropped image generated with a kernel size of 1×1 according to the comparative example and a case of compensation based on a cropped image generated with a kernel size of 1×1 in the normal area A1 and a kernel size of 3×3 in the optical area A2.

As shown in the graphs of FIG. 12, when the luminance of the optical area is measured at 192 Gray, it can be ascertained that white/green luminance uniformity is improved under the condition of variable kernel size compared to the existing conditions.

As described above, according to an aspect of the present disclosure, when luminance image data is generated by capturing pixels having different characteristics within one display panel using a camera, the accuracy of cropped image data can be improved by applying a variable kernel size depending on a pixel region using a pixel map having the same structure as the actual display panel.

The aspects of the present disclosure can have the following effects and advantages.

According to aspects of the present disclosure, it is possible to provide a luminance inspection system and a method of controlling the same, which can improve the accuracy of luminance measurement data by enhancing the accuracy of cropped image data generated based on a captured image when defects are detected using a camera.

According to aspects of the present disclosure, it is possible to provide a luminance inspection system and a method of controlling the same, which can improve the accuracy of a cropped image of a display panel in which an optical area for optical electronic devices such as a camera, a proximity sensor, and an illuminance sensor is formed to enhance compensation performance at the time of compensating for the luminance uniformity of the display panel with the optical area.

According to aspects of the present disclosure, it is possible to provide a luminance inspection system and a method of controlling the same, which can improve the accuracy of a cropped image and the compensation performance during compensation using a camera by generating a cropped image by applying different kernel sizes to an optical area for optical electronic devices and a normal area in the display panel.

The effects according to the present disclosure are not limited to the above description, and further various effects are included in the present disclosure.

It will be apparent to those skilled in the art that various modifications and variations can be made in the present disclosure without departing from the spirit or scope of the present disclosure. Thus, it is intended that the present disclosure covers the modifications and variations of the present disclosure provided they come within the scope of the appended claims and their equivalents.

What is claimed is:

1. A luminance inspection system comprising:

a camera configured to capture an image displayed on a display panel to generate a captured image; and an image processor configured to obtain location information of pixels in the captured image, divide the captured image into a plurality of pixel regions according to a preset pixel map, and calculate luminance data according to a kernel size set for each pixel region to generate a luminance image of the display panel, wherein the plurality of pixel regions include a normal area having a pixel array arranged, and an optical area having a transmission part for an optical device, and wherein the image processor sets a kernel size of the optical area to be larger than a kernel size of the normal area, and calculates luminance data depending on each kernel size.

2. The luminance inspection system of claim 1, wherein the preset pixel map includes location information of the plurality of pixel regions divided according to characteristics of a plurality of pixels included in the display panel.

3. The luminance inspection system of claim 1, wherein characteristics of pixels included the plurality of pixel regions are classified based on at least one of luminance, resolution, or Pixels Per Inch (PPI).

4. The luminance inspection system of claim 1, wherein the image processor generates luminance image data having a size matching an actual number of pixels of the display panel by calculating luminance data of the captured image included in each kernel.

5. The luminance inspection system of claim 1, wherein the kernel size of the normal area is set to 1×1, and the kernel size of the optical area is set to 3×3.

6. The luminance inspection system of claim 1, wherein the image processor obtains the location information of the pixels in the captured image and a pre-stored panel shape image.

7. The luminance inspection system of claim 1, further comprising:

a memory configured to store a shape image of the display panel for obtaining location information of the pixels in the captured image, a pixel map including location information of the plurality of pixel regions divided according to characteristics of pixels included in the display panel, and kernel sizes set for the pixel regions.

8. A method of inspecting luminance, the method comprising:

receiving a captured image obtained by capturing an image displayed on a display panel including a plurality of pixels;

obtaining location information of pixels in the captured image;

dividing the captured image into a plurality of pixel regions according to a preset pixel map;

setting kernel sizes according to the plurality of pixel regions;

calculating luminance data of the captured image included in each set kernel; and generating luminance image data having a size matching an actual number of pixels of the display panel based on the luminance data, wherein the plurality of pixel regions include a normal area having a pixel array arranged. and an optical area having a transmission part for an optical device, and wherein a kernel size of the optical area is set to be larger than a kernel size of the normal area.

9. The method of claim 8, wherein the obtaining of the location information of the pixels in the captured image comprises:

obtaining the location information of the pixels based on the captured image and a pre-stored panel shape image.

10. The method of claim 8, further comprising:

storing a shape image of the display panel for obtaining the location information of the pixels in the captured image, a pixel map including location information of the plurality of pixel regions classified according to characteristics of the pixels included in the display panel, and kernel sizes set for the pixel regions.

* * * * *